(No Model.) 4 Sheets—Sheet 1.
J. URBANEK.
RUNNING GEAR FOR VEHICLES.
No. 500,980. Fig. 1. Patented July 4, 1893.
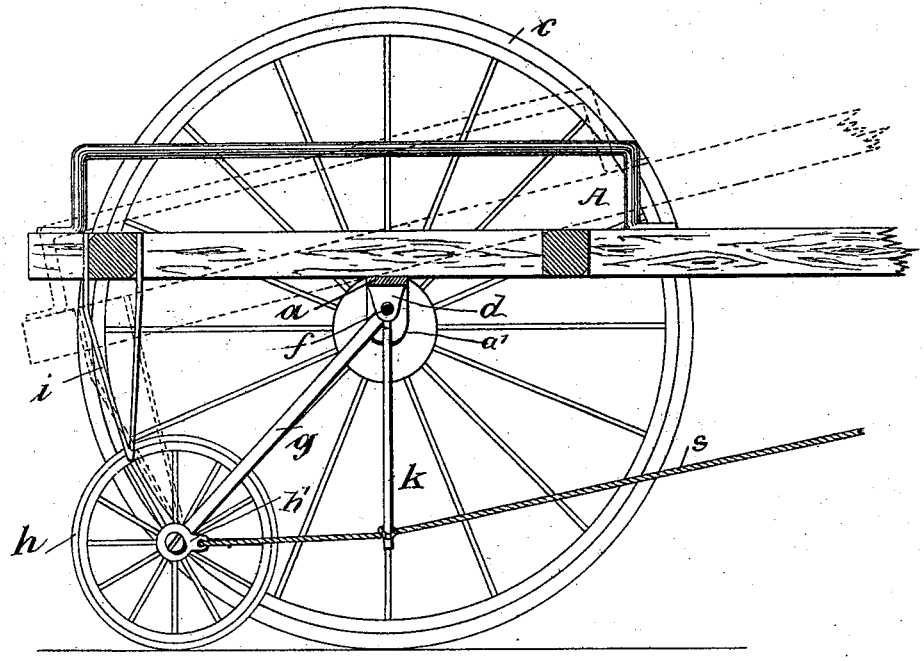
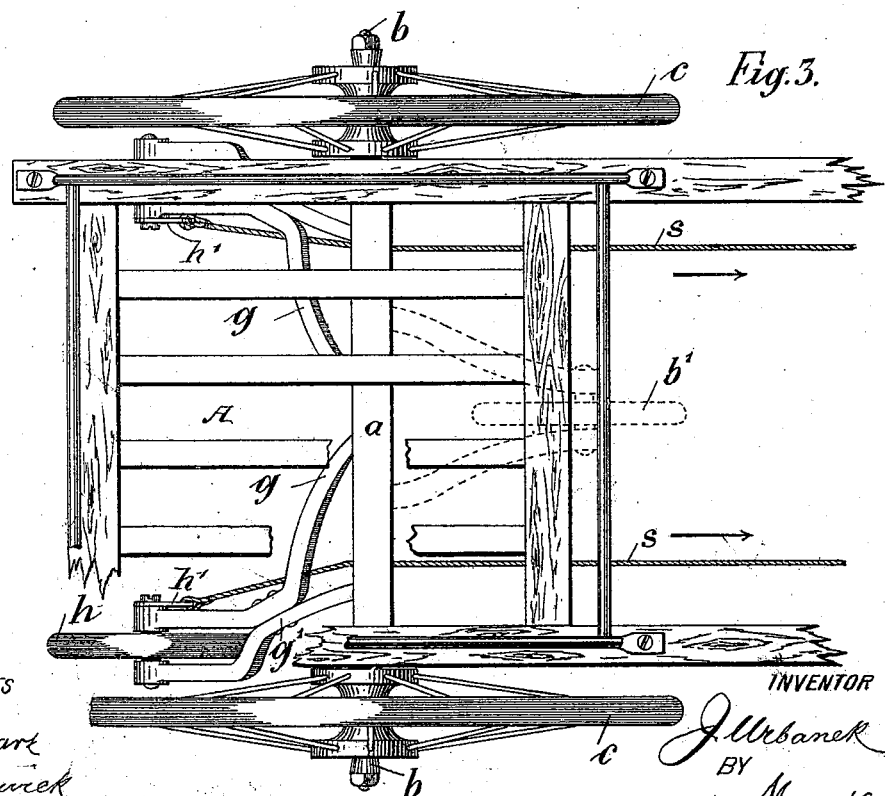
WITNESSES
E. M. Clark
C. Sedgwick
INVENTOR
J. Urbanek
BY
Munn & Co
ATTORNEYS.

(No Model.) 4 Sheets—Sheet 2.

J. URBANEK.
RUNNING GEAR FOR VEHICLES.

No. 500,980. Patented July 4, 1893.

WITNESSES
E. M. Clark
C. Sedgwick

INVENTOR
J. Urbanek
BY
Munn & Co
ATTORNEYS.

(No Model.) 4 Sheets—Sheet 3.
J. URBANEK.
RUNNING GEAR FOR VEHICLES.
No. 500,980. Patented July 4, 1893.
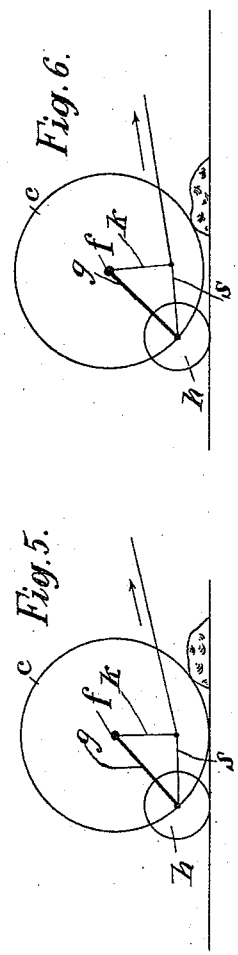
Fig. 6.
Fig. 5.
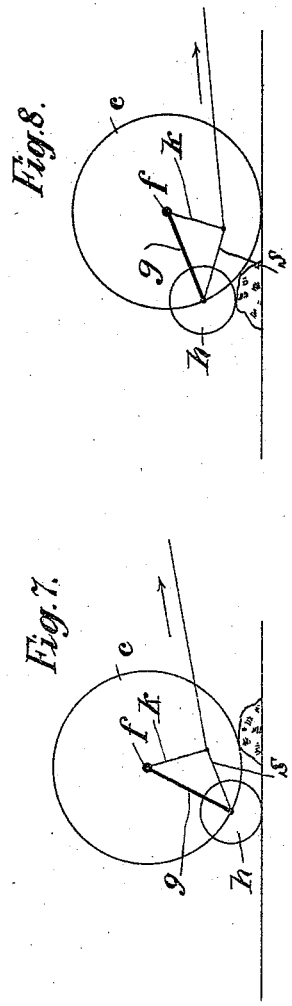
Fig. 8.
Fig. 7.
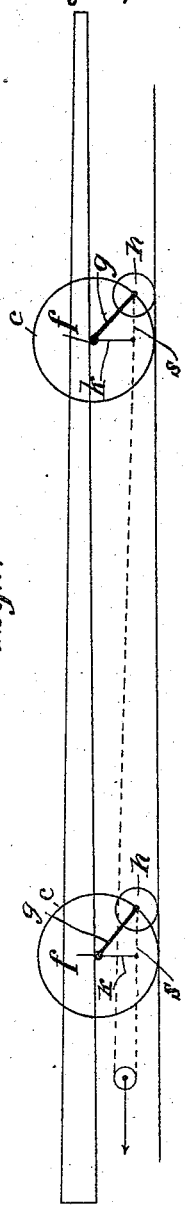
Fig. 9.
WITNESSES
E. M. Clark
C. Sedgwick
INVENTOR
J. Urbanek
BY
Munn & Co
ATTORNEYS.

(No Model.)  
4 Sheets—Sheet 4.

J. URBANEK.
RUNNING GEAR FOR VEHICLES.

No. 500,980. Patented July 4, 1893.

WITNESSES  
E. M. Clark  
C. Sedgwick

INVENTOR  
J. Urbanek  
BY  
Munn & Co  
ATTORNEYS.

UNITED STATES PATENT OFFICE.

JOHANN URBANEK, OF FRANKFORT-ON-THE-MAIN, GERMANY.

RUNNING-GEAR FOR VEHICLES.

SPECIFICATION forming part of Letters Patent No. 500,980, dated July 4, 1893.

Application filed March 7, 1893. Serial No. 464,948. (No model.)

*To all whom it may concern:*

Be it known that I, JOHANN URBANEK, engineer, of Frankfort-on-the-Main, in the Kingdom of Prussia and German Empire, have invented new and useful Improvements in Vehicle Attachments, of which the following is a full, clear, and exact description.

My invention relates to improvements in vehicle attachments, and the object of my invention is to produce an attachment which may be applied to any ordinary wheeled vehicle, and which will enable the wheels to pass readily over obstacles, such as stones, logs, &c., in their paths.

To this end, my invention consists in certain features of construction and combinations of parts, which will be hereinafter described and claimed.

Reference is to be had to the accompanying drawings forming a part of this specification, in which similar letters of reference indicate corresponding parts in all the views.

Figure 2:
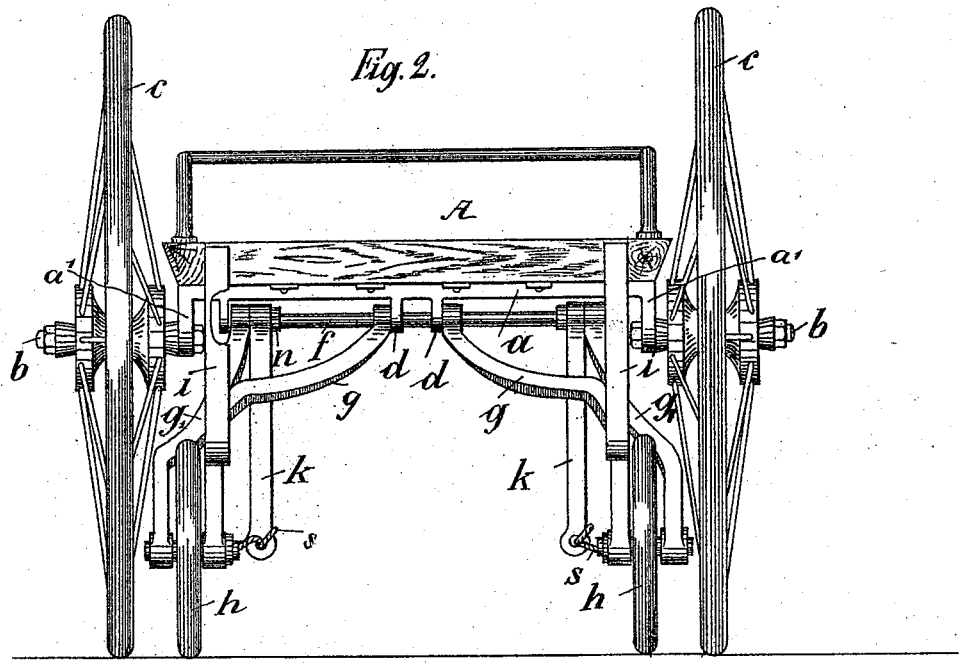
Figure 4:
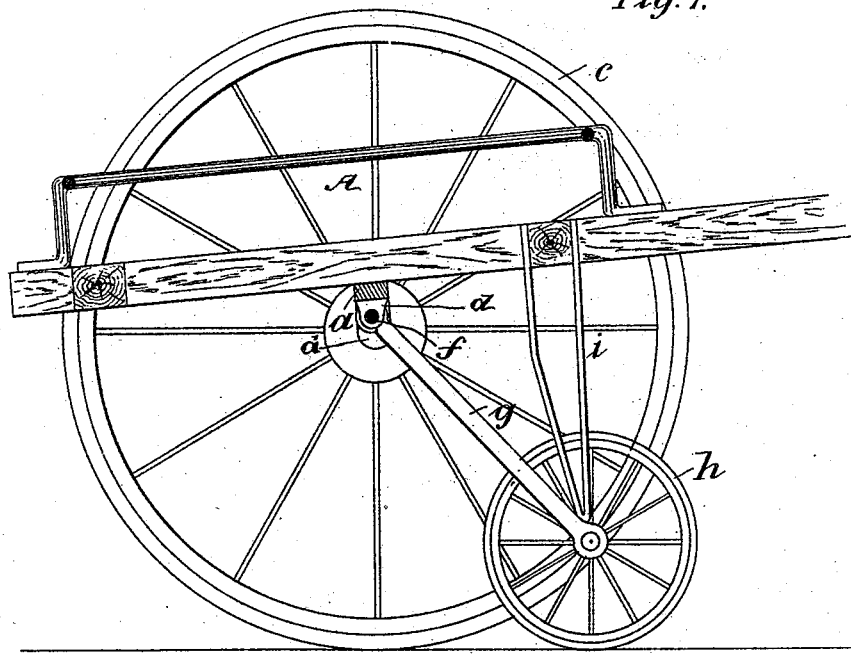
Figure 11:
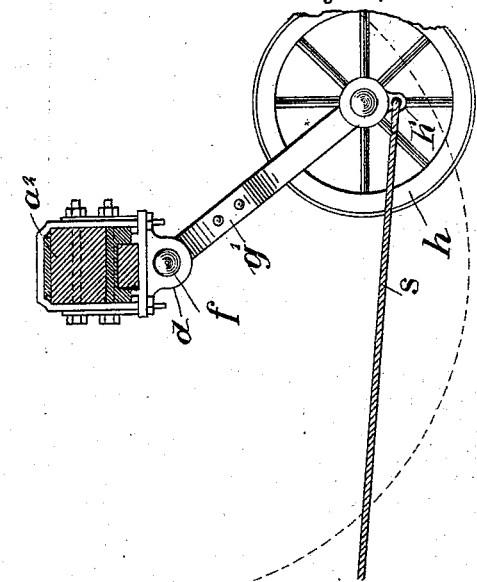
Figure 10:
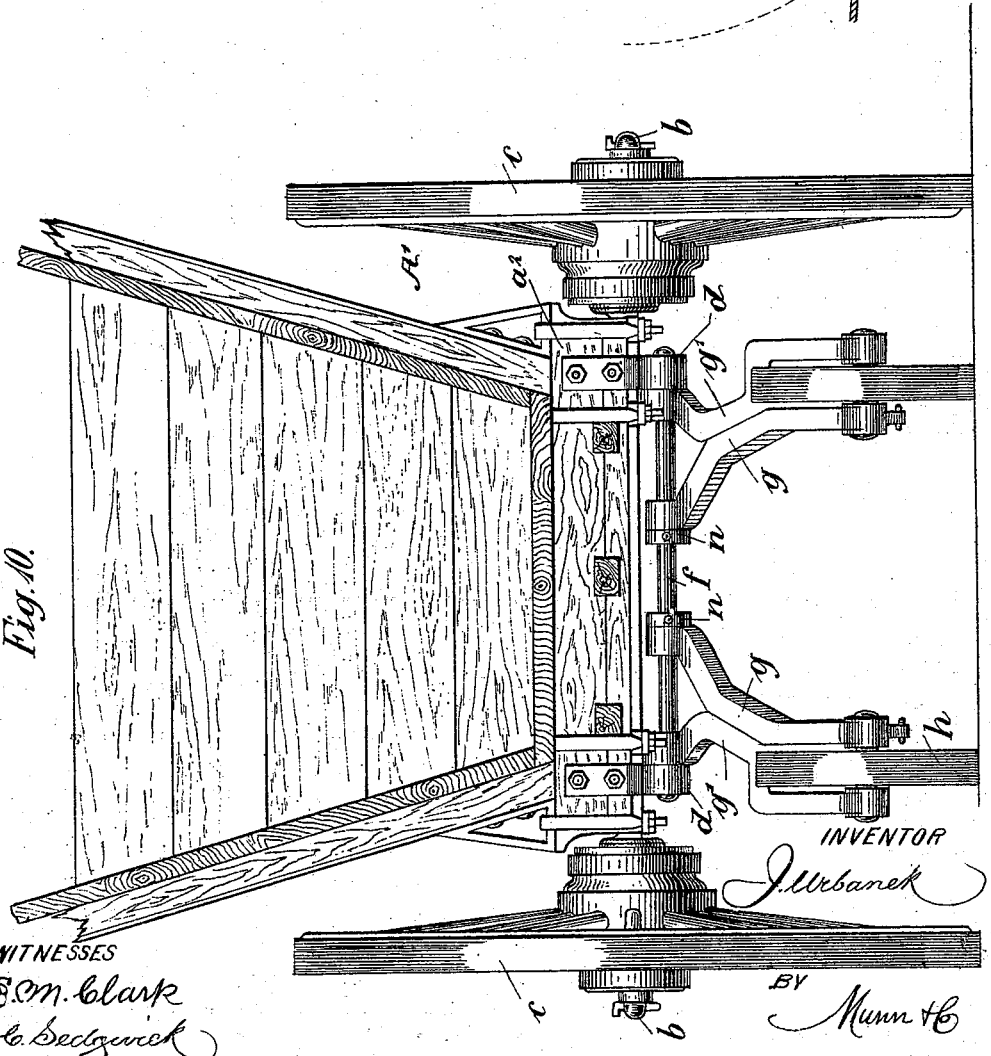

Figure 1 is a sectional side elevation of a common two-wheeled cart provided with my improved attachments. Fig. 2 is a rear end view of the same. Fig. 3 is a broken plan view of the cart. Fig. 4 is a sectional elevation of a slightly modified form of the attachment. Figs. 5 to 8 are diagrammatic views showing the different positions of the attachment as the wheels pass over obstructions. Fig. 9 is a diagrammatic view showing how the attachment may be applied to vehicles having two axles. Fig. 10 is a cross section of an ordinary cart having my improved attachments applied to it; and Fig. 11 is a detail sectional view showing the manner of applying the attachments to the cart axle.

Carriages, carts, and other vehicles built in the customary way are drawn from points placed substantially at the height of the axle of the wheels, but in my invention, for the purpose of enabling obstacles to be more readily surmounted, small accessory wheels $h$ are used, the operation of which will be described presently, and the draft is applied to them.

As shown in Figs. 1 to 3, the cart A, is provided with an ordinary axle $a$, having end lugs $a'$, in which the axles $b$ of the wheels $c$ are secured. The axle $a$ has depending lugs $d$, and these support a rock shaft $f$, to which, near opposite ends, are attached the depending and rearwardly extending forked frames $g$, $g'$, between the members of which, at the lower ends, are pivoted the small accessory wheels $h$, these being arranged to run near and a little behind the main wheels $c$, as shown best in Fig. 1. The axles of the wheels $h$ have eyes $h'$ secured to them, and to these the traces $s$ are secured, these traces being also secured to the lower ends of radius bars $k$, which are pivoted on the rock shaft $f$, between the frames $g$, $g'$, and collars $n$, and the radius bars enable the traces to always exert a constant leverage on the rock shaft.

The power for drawing the cart may be applied to the traces in any usual way. Above the lower portions of the frames $g$ $g'$, are limiting brackets $i$ which are secured to the cart, and these by engaging the frames, prevent the frames from being raised too high and the cart completely tipped over. In some instances it may be preferable to employ a central accessory wheel $b'$ as shown in dotted lines in Fig. 3.

The operation of the attachments will be clearly understood by reference to Figs. 5 and 6. When one or both of the main wheels $c$ strike an obstacle, as shown in Fig. 5, the leverage on the rock shaft and the draft on the wheels $h$, will cause the latter to hold their position on the ground and lift the main wheels easily and without excessive jar over the obstacle, the main wheels passing over first and the accessory wheels following, as clearly indicated in the diagrams Figs. 5 to 8.

As shown in Fig. 4, the accessory wheels are applied to a push cart, and are therefore extended in a direction opposite to that shown in Fig. 1. Here, the supports $i$ are elongated so as to rest upon the frames $g$ $g'$, and when the main wheels are to be pushed over an obstacle, the operator presses downward on the shafts, and the lower ends of the support act as a fulcrum and enable the main wheels to be lifted bodily and pushed over the obstacle.

Fig. 9 illustrates the way in which the attachment may be applied to vehicles having two axles, and here the accessory wheels are arranged behind each axle and are connected together by a cable extending over a suitable guide pulley, as indicated in the drawings, so that the attachments to both axles will work in unison, but the principle is exactly the same as if but one set of accessory wheels were used.

Figs. 10 and 11 show the application of the device to an ordinary cart. The cart A' is of the usual kind, and to its axle $a^2$ are secured lugs $d$, like those already described, except that they are fastened by means of clips or other suitable fastenings, and the rock shaft, the depending frames, the accessory wheels and traces are arranged exactly as described above, but the radius bars may, if desired, be dispensed with.

Having thus described my invention, I claim as new and desire to secure by Letters Patent—

1. The combination, with a wheeled vehicle, of rearwardly-extending frames pivoted beneath the vehicle, accessory wheels journaled in the lower ends of the frames, and draft traces applied to the axles of the accessory wheels, substantially as described.

2. The combination, with a wheeled vehicle, of the rock shaft pivoted beneath it, rearwardly-extending frames secured to the rock shaft, accessory wheels journaled in the frames, and draft traces applied to the accessory wheels, substantially as described.

3. The combination, with a wheeled vehicle, of rearwardly-extending frames pivoted beneath the vehicle, accessory wheels journaled in the lower ends of the frames, and supports secured to the vehicle and adapted to abut with the depending frames, substantially as described.

4. The combination, with a wheeled vehicle, of rearwardly-extending frames pivoted beneath the vehicle, accessory wheels journaled in the lower ends of the frames, radius bars extending downward from the vehicle adjacent to the frames, and draft traces connecting with the axles of the vehicles and with the radius bars, substantially as described.

In witness whereof I have hereunto set my hand in presence of two witnesses.

JOHANN URBANEK.

Witnesses:
PAUL FISCHER,
PAUL BRINKMANN.